US007889914B2

(12) United States Patent
Regli et al.

(10) Patent No.: US 7,889,914 B2
(45) Date of Patent: *Feb. 15, 2011

(54) AUTOMATED LEARNING OF MODEL CLASSIFICATIONS

(75) Inventors: William C. Regli, Philadelphia, PA (US); Cheuk Yiu Ip, Silver Spring, MD (US); Leonard Sieger, Jenkintown, PA (US)

(73) Assignee: Drexel University, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/479,414

(22) Filed: Jun. 5, 2009

(65) Prior Publication Data

US 2009/0319454 A1    Dec. 24, 2009

Related U.S. Application Data

(62) Division of application No. 10/869,061, filed on Jun. 16, 2004, now Pat. No. 7,639,868.

(60) Provisional application No. 60/478,995, filed on Jun. 16, 2003.

(51) Int. Cl.
*G06K 9/46* (2006.01)
*G06K 9/62* (2006.01)
*G06E 1/00* (2006.01)

(52) U.S. Cl. ........................ 382/159; 382/190; 382/224; 706/20; 707/101

(58) Field of Classification Search ................ 382/159, 382/228, 224, 225, 118, 190; 706/25, 45, 706/15, 20, 934, 13, 47, 59, 12; 707/102, 707/3, E17.003, 100, 101, 6; 702/19, 20; 705/3, 10, 17; 704/245, 9, 239, 246, E15.014, 704/E17.003, 230, 240, 256, 232, 244, 243; 725/46, 9

See application file for complete search history.

(56) References Cited

U.S. PATENT DOCUMENTS 5,323,333 A    6/1994    Johnson (Continued)

OTHER PUBLICATIONS

Agrawal et al., "Mining Association Rules between Sets of items in Large Databases", IBM Almaden Research Center, San Jose, CA, pp. 207-216.

(Continued)

*Primary Examiner*—Sheela C Chawan
(74) *Attorney, Agent, or Firm*—Knoble Yoshida & Dunleavy, LLC

(57) ABSTRACT

A method of providing an automated classifier for 3D CAD models wherein the method provides an algorithm for learning new classifications. The method enables existing model comparison algorithms to adapt to different classifications that are relevant in many engineering applications. This ability to adapt to different classifications allows greater flexibility in data searching and data mining of engineering data.

20 Claims, 20 Drawing Sheets

U.S. PATENT DOCUMENTS

| | | | |
|---|---|---|---|
| 6,016,487 | A | 1/2000 | Rioux et al. |
| 6,363,298 | B1 | 3/2002 | Shin et al. |
| 6,512,995 | B2 | 1/2003 | Murao |
| 6,584,455 | B1 | 6/2003 | Hekmatpour |
| 6,633,788 | B1 | 10/2003 | Riley et al. |
| 7,124,149 | B2 | 10/2006 | Smith et al. |
| 7,639,868 | B1 * | 12/2009 | Regli et al. ............ 382/159 |
| 2003/0208285 | A1 | 11/2003 | Regli et al. |
| 2003/0225719 | A1 | 12/2003 | Juang et al. |

OTHER PUBLICATIONS

Anthony et al., "An Approach to Capturing Structure, Behavior and Function of CAD Artifacts", ASME Journal of Computer and Information Science in Engineering, 17 pages.
Bespalov et al., "Scale-Space Representation of 3D Models and Topological Matching", 8 pages.
Cera et al., "A Collaborative 3D Environment for Authoring of Design Semantics", Drexel University Technical Report DU-MCS-01-06, Sep. 2001, 16 pages.
Ciaccia et al., "M-tree: an efficient access method for similarity search in metric spaces," Proceedings of the 23rd VLDB Conference, Athens, Greece, pp. 426-435 (1997).
Cicirello et al., "Machining Frature-based Comparisons of Mechanical Parts", 10 pages.
Cicirello et al., "Resolving Non-Uniqueness in Design Feature Histories," Drexel University publication, 9 pages (1999).
De Floriani, L.,"Feature extraction from boundary models of three-dimensional objects," IEEE Transactions on Pattern Analysis and Machine Inteligence 11(8):785-798 (1989).
Elinson et al., "Feature-based similarity assessment of solid models," ACM/SIGGRAPH Symp. on Solid Modeling and Applications, 14 pages (1997).
Fasulo, "An Analysis of Recent Work on Clustering Algorithms", Department of Computer Science & Engineering, Technical Report # 01-03-02, 23 pages.
Gupta et al., "Visual Information Retrival", Communications of the ACM, May 1997,vol. 40, No. 5 pp. 71-79.
Han et al., "Manufacturing feature recognition from solid models: a status report," IEEE Transactions on Robotics and Automation 16(6):782-783, 786-796 (2000).
Hilaga et al., "Topology Matching for Fully Automatic Similarity Estimation of 3D Shapes", ACM Siggraph 2001, Aug. 12-17, 2001, Los Angeles, CA, USA, pp. 203-212.
Ip et al., "Automated Learning of Model Classifications", SM '03, Jun. 16-20, 2003, Seattle, Washington, 6 pages.
Joshi et al., "Graph-based heuristics for recognition of machined features from a 3D solid model," Computer-Aided Design 20(2):58-66 (1998).
Marefat et al., "Geometric reasoning for recognition of three-dimensional object features," IEEE Transactions on Pattern Analysis and Machine Intelligence 12(10):949-965 (1990).
McWherter et al., "An Approach to Indexing Databases of Solid Models", 23 pages.
McWherter et al., "Database Techniques for Archival of Solid Models", Solid Modeling 01, Ann Arbor, Michigan, pp. 78-87.
McWherter et al., "Solid Model Databases: Techniques and Empirical Results", 22 pages.
McWherter et al., "Transformation Invariant Shape Similarity Comparison of Solid Models", Proceedings of DETC '2001, 2001 ASME Design Engineering Technical Conferences & Computers and Information in Engineering Conference, Sep. 9-12, 2001, Pittsburgh,PA, 10 pages.
Osada et al., "Matching 3D Models with Shape Distributions", 14 pages.
Osada et al., "Shape Distributions", ACM Transactions on Graphics, vol. 21, No. 4, Oct. 2002, pp. 807-832.
Qin et al., "Applying Case-Based Reasoning to Mechanical Bearing Design", Proceedings of DETC'00, 200 ASME Design Engineering Technical Conferences, Sep. 10-13, 2000, Baltimore, MD, 13 pages.
Regli et al., "A repository for design, process planning and assembly," Computer-Aided Design 29(12): 895-905 (1997).
Regli et al., "Managing Digital Libraries for Computer-Aided Design", Compuer-Aided Design, 20 pages.
Regli et al., "What are feature interactions?", Proceedings of The 1996 ASME Design Engineering Technical Conference and Computers in Engineering Conference Aug. 18-22, 1996, Irvine, California (1996), 12pages.
Sipe et al., "Global Feature Space Neural Network for Active Object Recognition", 6 pages.
Sipe, "Feature Space Trajectory Methods for Active Object Recognition", A Dissertation Submitted to the Graduate School in Partial Fulfillment of the Requirements for the degree of Doctor of Philosophy in Electrical and Computer Engineering, Carngie Mellon University, Pittsburgh, PA, 229 pages.
Smith et al., "A Deployed Engineering Design Retrieval Sysytem Using Neural Networks", IEEE Transactions on Neural networks, vol. 8, No. 4, Jul. 1997, pp. 847-851.
Sun et al., "Shape similarity assessment of mechanical parts based on solid models," Design Engineering Technical Conferences 83(2):953-962 (1995).
Talukder et al., "Nonlinear Features for Classification and Pose Estimation of Machined Parts from Single Views", 13 pages.
Thompson et al., "Feature-Based Reverse Engineering of Mechanical Parts", IEEE Transactions on Robotics and Automation, vol. 15, No. 1, Feb. 1999, pp. 57-66.
Ullmann, J.R., "An algorithm for subgragh isomorphism," J. Assoc. for Computer Machinery 23(1):31-42 (1976).
Vanderbrande et al., "Spatial reasoning for the automatic recognition of machinable features in solid models," IEEE Transactions on Pattern Analysis and Machine Intelligence 15(12:1269-1285 (1993).
Wu, J., "Content-based indexing of multimedia databases," IEEE Transactions on Knowledge and Data Engineering 9 (6):978-989 (1997).

* cited by examiner

| Wheels | Sockets | Housings |
|---|---|---|
|  Mazewheel |  Socket1 |  Part03 |
|  Unter2 |  SipeSocket |  SimpleBoeing |

FIG. 9A

| | | | | | | | | | | | | | | | | |
|---|---|---|---|---|---|---|---|---|---|---|---|---|---|---|---|---|
| I | 19.92 | 26.74 | 26.94 | 33.01 | | | 37.65 | 20.38 | 40.88 | 34.44 | 40.51 | 57.21 | 42.01 | 39.09 | 37.45 | 45.46 |
| O | 86.74 | 50.79 | 60.32 | 55.26 | | | 93.59 | 39.77 | 77.06 | 72.93 | 51.60 | 46.77 | 79.51 | 89.24 | 86.70 | 81.77 |
| M | 32.22 | 63.12 | 33.10 | 29.39 | | | 45.53 | 40.17 | 81.23 | 79.43 | 63.95 | 134.66 | 62.36 | 62.37 | 55.22 | 76.53 |
| I | 35.28 | 37.17 | 45.70 | 27.68 | 37.65 | 0 | 0 | 32.37 | 28.61 | 26.44 | 25.73 | 46.92 | 25.91 | 29.04 | 28.81 | 33.52 |
| O | 31.22 | 79.13 | 43.10 | 40.16 | 93.59 | 0 | 0 | 88.90 | 42.53 | 31.37 | 29.05 | 33.40 | 59.13 | 63.78 | 56.39 | 42.42 |
| M | 27.38 | 32.62 | 22.25 | 23.97 | 45.53 | 0 | 0 | 24.08 | 56.38 | 52.91 | 42.39 | 119.95 | 44.22 | 39.25 | 29.22 | 47.23 |
| I | 29.12 | 36.48 | 36.85 | 28.23 | 0 | 29.52 | 31.48 | 24.55 | 20.26 | 13.83 | 18.06 | 38.77 | 16.39 | 11.62 | 9.10 | 17.26 |
| O | 50.02 | 89.59 | 51.90 | 47.47 | 0 | 45.52 | 95.47 | 86.07 | 24.62 | 22.76 | 35.90 | 25.66 | 42.81 | 47.42 | 33.64 | 38.96 |
| M | 65.49 | 47.45 | 52.17 | 40.16 | 0 | 43.33 | 75.86 | 55.84 | 22.64 | 19.04 | 24.65 | 81.16 | 16.88 | 25.16 | 19.34 | 13.52 |
| I | 17.92 | 30.37 | 28.94 | 56.99 | 28.23 | 27.68 | 33.01 | 48.02 | 41.71 | 34.03 | 40.65 | 59.74 | 41.01 | 38.83 | 36.00 | 46.27 |
| O | 30.62 | 45.93 | 14.97 | 0 | 47.47 | 40.16 | 55.26 | 29.65 | 34.21 | 33.05 | 25.11 | 33.60 | 37.64 | 41.11 | 37.56 | 26.83 |
| M | 22.12 | 34.60 | 9.90 | 0 | 56.99 | 43.10 | 29.39 | 22.70 | 66.84 | 64.72 | 51.26 | 128.08 | 49.96 | 45.32 | 39.24 | 58.97 |
| I | 20.49 | 28.30 | 0 | 28.94 | 36.48 | 45.70 | 26.94 | 21.76 | 50.86 | 40.78 | 50.86 | 66.49 | 51.08 | 48.16 | 45.09 | 55.33 |
| O | 31.98 | 54.62 | 0 | 14.97 | 36.85 | 43.33 | 60.32 | 48.71 | 34.06 | 33.91 | 23.02 | 34.13 | 38.01 | 40.94 | 40.68 | 28.52 |
| M | 22.34 | 32.22 | 0 | 9.90 | 51.90 | 27.68 | 33.10 | 53.20 | 63.20 | 61.16 | 47.53 | 124.43 | 47.22 | 41.50 | 34.79 | 54.27 |
| I | 0 | 22.34 | 28.30 | 30.37 | 36.48 | 40.16 | 50.79 | 24.01 | 47.89 | 38.73 | 47.09 | 64.92 | 46.66 | 45.15 | 42.71 | 52.43 |
| O | 0 | 20.49 | 54.62 | 45.93 | 29.12 | 47.45 | 26.74 | 48.71 | 73.12 | 64.46 | 47.68 | 46.59 | 84.61 | 97.85 | 81.02 | 72.11 |
| M | 0 | 31.98 | 32.22 | 34.60 | 32.62 | 89.59 | 50.79 | 53.20 | 60.22 | 57.29 | 53.05 | 124.18 | 45.24 | 35.60 | 39.55 | 52.45 |
| I | 0 | 0 | 22.34 | 28.30 | 36.48 | 36.48 | 17.92 | 13.02 | 42.83 | 35.53 | 41.55 | 60.61 | 42.83 | 40.89 | 37.95 | 47.82 |
| O | 70.20 | 70.20 | 20.49 | 54.62 | 29.12 | 47.45 | 50.02 | 79.34 | 45.37 | 33.40 | 18.42 | 34.43 | 55.18 | 58.75 | 55.06 | 32.11 |
| M | 46.22 | 46.22 | 31.98 | 32.22 | 35.28 | 27.38 | 65.49 | 29.61 | 78.11 | 75.67 | 64.58 | 141.08 | 63.45 | 62.54 | 50.37 | 68.55 |

|   |   |   |   |   |   | MACHINED |   |   |   |   |   |   | MOLDED |   |   |   |
|---|---|---|---|---|---|---|---|---|---|---|---|---|---|---|---|---|
| I | 47.82 | 52.43 | 55.33 | 46.27 | 10.64 | 6.64 | 11.58 | 24.95 | 17.26 | 33.52 | 45.46 | 41.12 | 9.99 | 8.23 | 11.47 | 0 |
| O | 32.11 | 72.11 | 28.52 | 26.83 | 26.37 | 25.47 | 18.44 | 31.17 | 38.96 | 42.42 | 81.77 | 72.01 | 36.31 | 37.53 | 28.43 | 0 |
| M | 68.55 | 52.45 | 54.27 | 58.97 | 24.61 | 21.39 | 23.38 | 77.99 | 13.52 | 47.23 | 76.53 | 55.73 | 19.43 | 26.19 | 21.82 | 0 |
| I | 37.95 | 42.71 | 45.09 | 36.00 | 15.90 | 8.84 | 15.10 | 33.08 | 9.10 | 28.81 | 37.45 | 31.64 | 12.60 | 6.84 | 0 | 11.47 |
| O | 55.06 | 81.02 | 40.68 | 37.56 | 24.25 | 31.82 | 31.90 | 29.91 | 33.64 | 56.39 | 86.70 | 73.89 | 23.87 | 34.82 | 0 | 28.43 |
| M | 50.37 | 39.55 | 34.79 | 39.24 | 31.42 | 29.11 | 17.42 | 91.83 | 19.34 | 29.22 | 55.22 | 36.61 | 19.46 | 18.93 | 0 | 21.82 |
| I | 40.89 | 45.15 | 48.16 | 38.83 | 13.82 | 7.08 | 13.09 | 29.33 | 11.62 | 29.04 | 39.09 | 34.76 | 9.41 | 0 | 6.84 | 8.23 |
| O | 58.75 | 97.85 | 40.94 | 41.11 | 35.80 | 41.39 | 27.68 | 30.91 | 47.42 | 63.78 | 89.24 | 80.88 | 27.90 | 0 | 34.82 | 37.55 |
| M | 62.54 | 35.60 | 41.50 | 45.32 | 34.92 | 31.66 | 26.60 | 92.22 | 25.16 | 39.25 | 62.37 | 52.13 | 15.86 | 0 | 18.93 | 26.19 |
| I | 42.83 | 46.66 | 51.08 | 41.01 | 12.78 | 10.19 | 10.67 | 29.99 | 16.39 | 25.91 | 42.01 | 36.42 | 0 | 9.41 | 12.60 | 9.99 |
| O | 55.18 | 84.61 | 38.01 | 37.64 | 27.00 | 37.83 | 28.40 | 31.19 | 42.81 | 59.13 | 79.51 | 67.23 | 0 | 27.90 | 23.87 | 36.31 |
| M | 63.45 | 45.24 | 47.22 | 49.96 | 23.00 | 19.94 | 17.84 | 71.47 | 16.88 | 44.22 | 62.36 | 51.37 | 0 | 15.86 | 19.46 | 19.43 |
| I | 13.02 | 24.01 | 22.70 | 21.76 | 39.25 | 30.86 | 36.81 | 56.08 | 24.55 | 32.37 | 20.38 | 0 | 36.42 | 34.76 | 31.64 | 41.12 |
| O | 79.34 | 48.71 | 52.16 | 48.02 | 68.39 | 68.05 | 46.08 | 44.74 | 86.07 | 88.90 | 39.77 | 0 | 67.23 | 80.88 | 73.89 | 72.01 |
| M | 29.61 | 53.20 | 28.88 | 29.65 | 65.83 | 63.91 | 47.54 | 122.86 | 55.84 | 24.08 | 40.17 | 0 | 51.37 | 52.13 | 36.61 | 55.73 |
| I | 19.92 | 26.74 | 26.94 | 33.01 | 40.88 | 34.44 | 40.51 | 57.21 | 31.48 | 37.65 | 0 | 20.38 | 42.01 | 39.09 | 37.45 | 45.46 |
| O | 86.74 | 50.79 | 60.32 | 55.26 | 77.06 | 72.93 | 51.60 | 46.77 | 95.47 | 93.59 | 0 | 39.77 | 79.51 | 89.24 | 86.70 | 81.77 |
| M | 32.22 | 63.12 | 33.10 | 29.39 | 81.23 | 79.43 | 63.95 | 134.66 | 75.86 | 45.53 | 0 | 40.17 | 62.36 | 62.37 | 55.22 | 76.53 |
| I | 35.28 | 37.17 | 45.70 | 27.68 | 28.61 | 26.44 | 25.73 | 46.92 | 29.52 | 0 | 37.65 | 32.37 | 25.91 | 29.04 | 28.81 | 33.52 |
| O | 31.22 | 79.13 | 43.10 | 40.16 | 42.53 | 31.37 | 29.05 | 33.40 | 45.52 | 29.52 | 93.59 | 88.90 | 59.13 | 63.78 | 56.39 | 42.42 |
| M | 27.38 | 32.62 | 22.25 | 23.97 | 56.38 | 52.91 | 42.39 | 119.95 | 43.33 | 45.52 | 45.53 | 24.08 | 44.22 | 39.25 | 29.22 | 47.23 |
| I | 29.12 | 36.48 | 36.85 | 28.23 | 20.26 | 13.83 | 18.06 | 38.77 | 0 | 29.52 | 31.48 | 24.55 | 16.39 | 11.62 | 9.10 | 17.26 |
| O | 50.02 | 89.59 | 51.90 | 47.47 | 24.62 | 22.76 | 35.90 | 25.66 | 0 | 45.52 | 95.47 | 86.07 | 42.81 | 47.42 | 33.64 | 38.36 |
| M | 65.49 | 47.45 | 52.17 | 56.99 | 22.64 | 19.04 | 24.65 | 81.16 | 0 | 43.33 | 75.86 | 55.84 | 16.88 | 25.16 | 19.34 | 13.52 |
| I | 60.61 | 64.92 | 66.49 | 59.74 | 27.59 | 21.98 | 31.08 | 0 | 38.77 | 46.92 | 57.21 | 56.08 | 29.99 | 29.33 | 33.08 | 24.95 |
| O | 34.43 | 46.59 | 34.13 | 33.60 | 24.92 | 24.99 | 30.75 | 0 | 25.66 | 33.40 | 46.77 | 44.74 | 30.91 | 29.33 | 29.91 | 31.17 |
| M | 141.08 | 124.18 | 124.43 | 128.08 | 60.79 | 65.28 | 79.60 | 0 | 81.16 | 119.95 | 134.66 | 122.86 | 71.47 | 92.22 | 91.83 | 77.99 |

| | IN | OUT | MIXED | Weighted | Gaussian Regression |
|---|---|---|---|---|---|
| | 34.81 | 48.14 | 37.43 | 38.81 | 7.75E-36 |
| | 35.26 | 76.33 | 22.93 | 39.77 | 1.58E-37 |
| | 34.06 | 28.03 | 16.46 | 25.96 | 3.40E-17 |
| | 32.42 | 32.14 | 21.73 | 28.26 | 5.46E-20 Total:3.41E-17 |
| | 41.84 | 53.75 | 48.41 | 47.04 | 1.21E-51 |
| | 34.82 | 56.89 | 28.73 | 37.45 | 1.64E-33 |
| | 37.49 | 65.69 | 40.56 | 45.01 | 1.81E-47 |
| | 32.47 | 56.84 | 37.58 | 39.91 | 8.98E-38 Total:1.64E-33 |
| | 39.92 | 42.92 | 55.99 | 45.30 | 4.78E-48 |
| | 47.75 | 37.08 | 58.38 | 47.83 | 2.55E-53 |
| | 46.37 | 24.55 | 43.86 | 39.66 | 2.54E-37 |
| | 61.18 | 34.00 | 119.29 | 70.17 | 2.44E-112 Total:2.55-E36 |
| | 48.51 | 30.00 | 41.54 | 41.44 | 1.45E-40 |
| | 47.90 | 30.18 | 34.12 | 39.12 | 2.24E-36 |
| | 46.28 | 41.00 | 30.63 | 47.05 | 1.22E-38 |
| | 52.99 | 36.75 | 51.07 | 47.98 | 1.20E-53 Total:2.25E-36 |

FIG. 12

| | IN | OUT | MIXED | Weighted | Gaussian Regression | |
|---|---|---|---|---|---|---|
| | 34.81 | 48.14 | 37.43 | 41.11 | 6.05E-40 | |
| | 35.26 | 76.33 | 22.93 | 47.14 | 7.54E-52 | |
| | 34.06 | 28.03 | 16.46 | 25.15 | 2.85E-16 | |
| | 32.42 | 32.14 | 21.73 | 28.36 | 4.05E-20 | Total:2.85E-16 |
| | 39.92 | 42.92 | 55.99 | 47.05 | 1.12E-51 | |
| | 47.75 | 37.08 | 58.38 | 47.41 | 2.01E-52 | |
| | 46.37 | 24.55 | 43.86 | 36.72 | 2.74E-32 | |
| | 61.18 | 34.00 | 119.29 | 71.76 | 2.10E-117 | Total:2.74-E32 |
| | 41.84 | 53.75 | 48.41 | 46.58 | 1.10E-50 | |
| | 34.82 | 56.89 | 28.73 | 38.43 | 3.60E-35 | |
| | 37.49 | 65.69 | 40.56 | 45.17 | 8.49E-48 | |
| | 32.47 | 56.84 | 37.58 | 39.81 | 1.38E-37 | Total:3.61E-35 |
| | 48.51 | 30.00 | 41.54 | 42.06 | 1.02E-41 | |
| | 47.90 | 30.18 | 34.12 | 39.71 | 2.03E-37 | |
| | 46.28 | 41.00 | 30.63 | 40.57 | 5.86E-39 | |
| | 52.99 | 36.75 | 51.07 | 48.52.98 | 8.12E-55 | Total:2.09E-37 |

FIG. 13

AUTOMATED LEARNING OF MODEL CLASSIFICATIONS

CROSS-REFERENCE TO RELATED APPLICATIONS

This Application is a continuation of U.S. patent application Ser. No. 10/869,061, filed Jun. 16, 2004, which in turn is a non-provisional of U.S. Provisional Application No. 60/478,995, filed Jun. 16, 2003, the entire disclosures of which are hereby incorporated by reference as if set forth fully herein.

STATEMENT REGARDING FEDERALLY SPONSORED RESEARCH OR DEVELOPMENT

This invention was made with Government support with the Knowledge and Distributed Intelligence in the Information Age (KDI) initiative Grant CISE/IIS-9873005; CAREER Award CISE/IIS-9733545 and Grant ENG/DMI-9713718 awarded by the National Science Foundation (NSF); and N00014-01-1-0618 awarded by the Office of Naval Research; the Government has certain rights to this invention.

BACKGROUND OF THE INVENTION

1. Field of the Invention

The invention relates to the field of solid model classification and searching. In particular it relates to method and system for classifying and searching solid models using a learning algorithm.

2. Description of the Related Technology

Solid models are the critical data elements in modern Computer-Aided Design (CAD) environments, describing the shape and form of parts and assemblies. Increasingly, manufacturing enterprises maintain vast databases (also known as knowledge-bases) of Computer-Aided Design information as well as computer aided manufacturing (CAM) and Computer-Aided Process Planning (CAPP) information associated with the solid models. Such information includes, in addition to the solid models of the parts and assemblies, numeric control (NC) machining programs, production plans and cost data associated with manufacturing the parts and assemblies.

CAD, CAM and CAPP information of previously designed parts and assemblies is useful for process planning and cost estimation of new parts. Such information is generally sought based on perceived similarity of shape and/or structure and/or manufacturing process. However, many existing database systems storing solid models index the solid models based only on simple properties that have little to do with the structure or shape of the part, i.e. part name, designer's name, bills of materials etc. and do not use content and shape-based analysis of the solid models to index the solid models.

A problem in CAD has been the diversity and heterogeneity of representation formats for the shape information. At a fundamental level, Constructive Solid Geometry (CSG) and Boundary Representation Models (BRep) serve as a foundation for most modeling systems and applications. While BReps dominate the CAD industry, the mathematical details of the representation vary widely by system. Hence, even when data translation works well, there is little to guarantee that the resulting solid models can be directly compared.

Two types of BReps dominate the commercial CAD environment: NURBS-based BReps (e.g., SDRC, Pro/E, where NURBS are the primary internal representation) and those dominated by analytic Surface BReps (e.g. Parasolid, ACIS, where analytic surfaces CO-exist with NURBS). Comparing CAD models for indexing across these formats can be very difficult requiring considerable amounts of special-case algorithms for each different representation. Therefore, it is necessary to have a uniform methodology to interact with CAD data in engineering information management systems in order to alleviate the problems caused by the diversity of representation formats.

In the engineering field, indexing of parts and part families had been done with group technology (GT) coding. Group technology was designed to facilitate process planning and cell-based manufacturing by imposing a classification scheme on individual machined parts. These techniques were developed prior to the advent of inexpensive computer technology; hence they are not rigorously defined and are intended for human, not machine, interpretation. Some of the early work on feature identification from solid models aimed to find patterns in model databases or automate the GT coding process. The common aspect of all of these techniques is that they are all post priori: one runs their algorithm on model and it produces the category or label for it. This raises issues such as changing categorization schemes and whether or not an entirely new algorithm is needed to compensate for such changes.

There are two basic types of approaches for matching and retrieval of 3D CAD data: (1) feature-based techniques and (2) shape-based techniques. The feature-based techniques go back at least as far as the late 1970s to Kyprianou's thesis, and extract engineering features (machining features, form features, etc.) from a solid model of a mechanical part for use in database storage, automated GT coding, etc. Feature-based reasoning was used for the retrieval of solid models for use in variant process planning. It was further examined how to develop graph-based data structures and create heuristic similarity measures among artifacts. This work was extended to manufacturing feature based similarity measurements. These ideas have been integrated with database techniques to enable indexing and clustering of CAD models based on shape and engineering properties.

The shape-based techniques are more recent, owing to research contributions from computational geometry, computer vision and computer graphics. A shape based approach works as the representational "lowest common denominator:" STL or VRML (or other) polygon mesh. From the polygon mesh, measures of similarity can be computed among 3D models. A method has been created for generating an abstraction of a 3D model as a probability distribution of samples from a shape function acting on the model. This technique is generally robust under model degradation. But it is a rigid technique and poor discriminator among model classes because it analyzes gross model shape, rather than the discriminatory features that are common for CAD/CAM data. Additionally, recent published studies have focused on a very limited set of heterogeneous (planes, trees, phones, etc.) and manually-classified 3D graphics, animation and rendering models; a set that does not include any models that are specifically engineering, solid modeling or mechanical CAD oriented.

In the CAD/CAM domain, engineering artifacts can have multiple classifications. For example, discrete machined parts can be classified in to different categories according to different classification criterion, such as functionality (e.g., brackets or fasteners), manufacturing cost, manufacturing process (e.g., casting, machining, forging, molding, etc). FIG. 1 shows four CAD models under two different, but perfectly reasonable, classification schemes. The first classification is based on manufacturing process, where parts are separated into either "3-axis machining" or "casting" processes. In machining, rotating cutting tools remove material based on swept volumes; in this case these sweeps are limited to those on a 3-axis vertical machining center. The second, orthogonal classification is based on mechanical function. FIG. 1 also shows a break down into parts that function as "brackets" and as "housings." These two different types of classification systems would typically require two different searching algorithms to compensate for the different search criteria. This therefore creates a needless waste of resources.

Therefore, there is a need for a method for classifying solid objects for improved searching that uses a uniform methodology that can handle the complexity of models that are used for engineering components. There is also a need for a method for enabling a model comparison algorithm to adapt to different classifications that are relevant in many engineering applications

SUMMARY OF THE INVENTION

According to a first aspect of the invention, a method of classifying solid models including the steps of providing a plurality of training models, determining a first set of values based on predetermined properties of said training models, defining classifications based upon said first set of values, providing a query model, determining a second set of values based on said predetermined properties of said query model, comparing said second set of values to said classifications, and determining at least one of said classifications of said query model based on said comparing step.

According to a second aspect of the invention, a method of searching for a solid model including the steps of, providing a query model, determining a first set of values based on predetermined properties of said query model, comparing said first set of values to definitions for classification, wherein said definitions for said classification are based on a second set of values that is determined by said predetermined properties for a group of training models, and determining a classification of said query model based on said comparing step.

According to a third aspect of the invention, a system for classifying solid models including a database for storing a plurality of training models and classification definitions, wherein said classification definitions are based upon a first set of values determined by predetermined properties of said training models, and a host unit connected to said database for receiving a query model, said and determining a second set of values based on said predetermined properties of said query model, said host and determining a classification of said query model by comparing said second set of values to said classification definitions.

According to a fourth aspect of the system, a method for training a system for classifying solid models, including the steps of providing a plurality of training models, selecting points on said training models, wherein said selected points comprise a first set of point pairs selected from points located on an interior of said training model, a second set of point pairs located on an exterior of said training model and a third set of point pairs located on both said interior of said training model and said exterior of said training model, determining a first set of values based upon distances between points from said first set of point pairs, determining a second set of values based upon distances between points from said second set of point pairs, determining a third set of values based upon distances between points from said third set of point pairs, and defining classifications based upon said first set, said second set, and said third set of the values.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 9 shows a chart depicting the distances between training models used in the Functional classification.

FIG. 10 shows a chart depicting the distances between training models used in the Manufacturing classification.

FIG. 12 shows a chart with the distances and classification for Functional classification.

FIG. 13 shows a chart with the distances and classification for Manufacturing classification.

DETAILED DESCRIPTION OF THE PREFERRED EMBODIMENT(S)

The following method has been implemented in Java/Perl and executed on Solaris platforms. However other programs and platforms may be used. The mechanical data used in the examples below were from the National Design Repository.

The searching method in the instant invention utilizes nearest neighbor machine learning. The k nearest neighbor learning algorithm learns classifications by storing training examples and classifies query instances according to examples that are the closest to the query instances. This algorithm is an instance-based, unsupervised machine-learning algorithm typically used for pattern recognition, learning complex functions and data mining. The kNN algorithm requires a set of example instances to be used as the model answers for classifying query instances. The algorithm also requires a distance metric returning a numerical value describing the dissimilarity between two data instances. Also required are k example instances to be inspected to determine the classification of a query instance and a locally weighting function for combining the k local points into the result.

Data instances are described by n attributes, projected into an n-dimensional data space as a vector $<a_1, a_2, \ldots, a_n>$ and then given as input to kNN. In applying the algorithm to 3D solid models, this corresponds to a 2D shape histogram. Similar data instances are expected to fall into the same categories and to distribute close to one another in the data space, forming clusters of parts that represent different categories.

Figure 1:
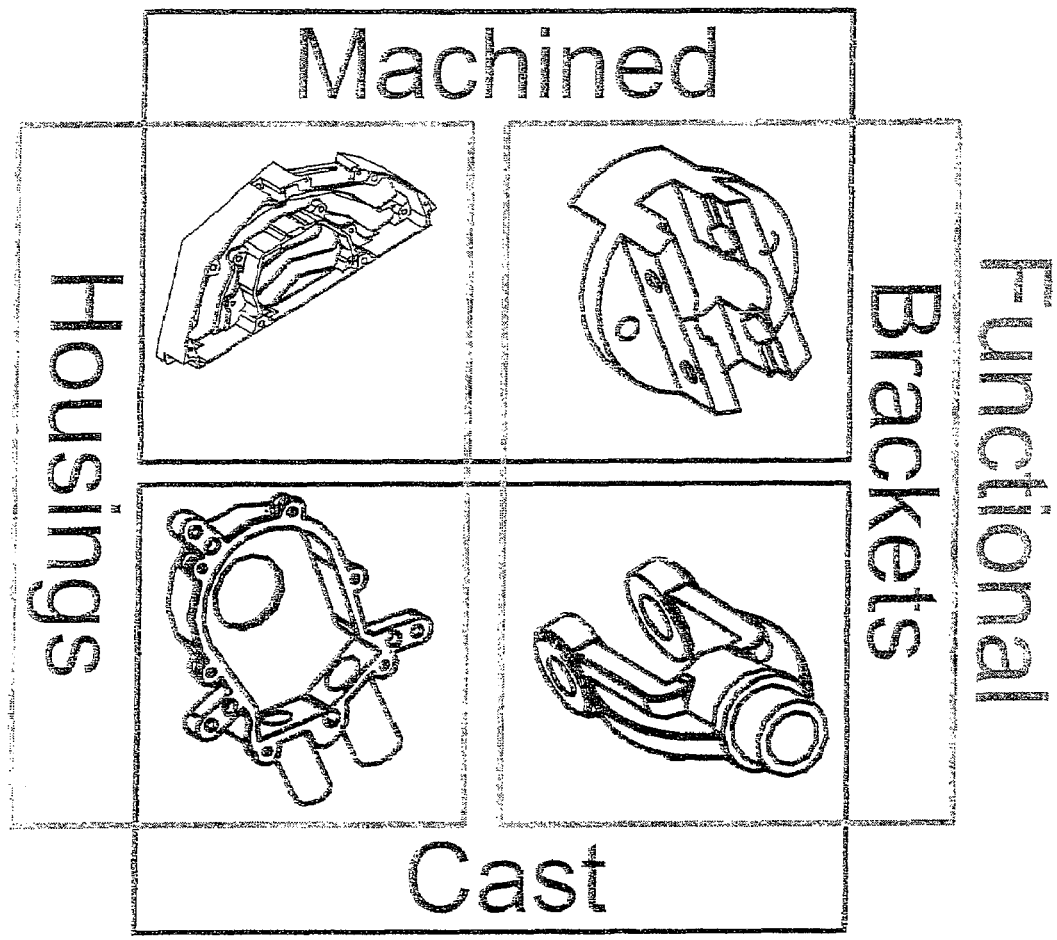
FIG. 1 shows a diagram depicting different classification schemes.
Figure 2:
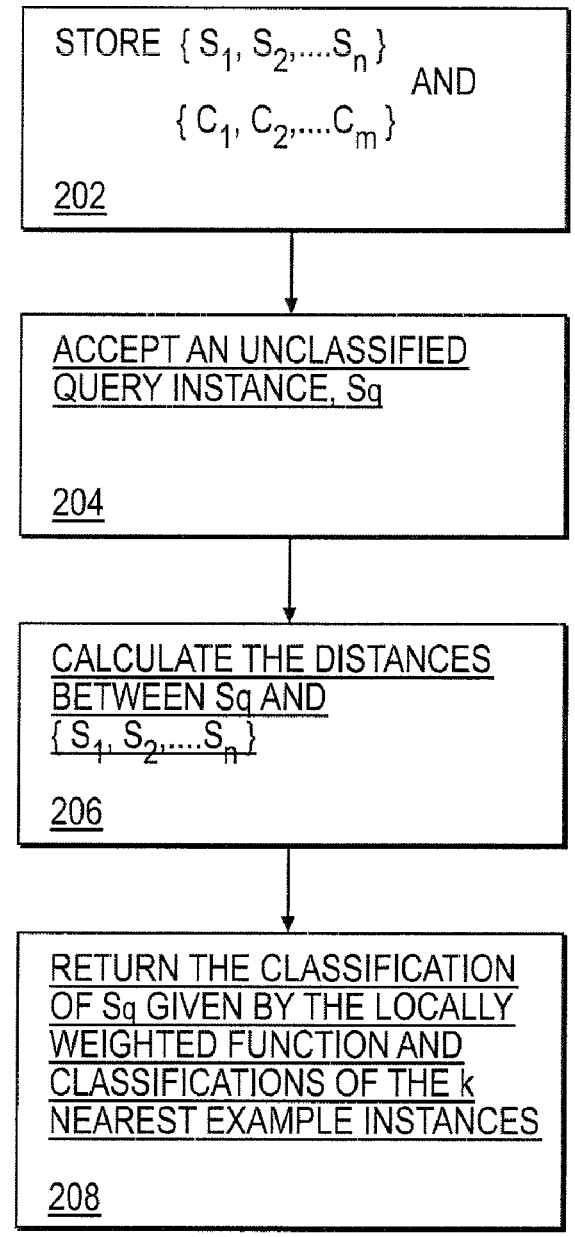
FIG. 2 shows a flow chart of the kNN learning algorithm.

The kNN learning algorithm works off this assumption and classifies query instances according the classification of the k nearest example instance of the query instance. FIG. 2 shows the operation of the kNN learning algorithm when given a set of sample instances and their corresponding classifications. At step 202, sample instances $\{s_1, s_2 \ldots s_n\}$ and their corresponding classifications $\{c_1, c_2 \ldots c_m\}$ are stored. At step 204, an unclassified query instance $s_q$ is accepted. At step 206, the distances between $s_q$ and $\{s_1, s_2 \ldots s_n\}$ are calculated. At step 208, the classification of $s_q$ given by the locally weighted function and classifications of the k nearest example instances is returned.

According to the kNN algorithm for 3D model matching, it is possible to use a small subset of example training models and perform classifications based on the input training models. This permits the matching algorithm to learn arbitrary classification schemes. This can then be used to optimize performance for a particular classification schema and a model comparison algorithm pair by adjusting the parameters of the model comparison algorithm. In this way, the shape matching technique is tuned to return short distances for models falling in the same category but larger distances for models falling in different categories. Given a set of example CAD training models and their corresponding categories, the relevant properties are selected and weighted to automatically construct a model classifier. This integrates traditional AI and machine learning with CAD and shape modeling. Specifically, by altering 3D model matching techniques, patterns or properties of classification can be extracted from different perspectives to fit various classification schemes. Given different reasonable example training models, this approach can learn useful classification schemes to a reasonable degree of accuracy, therefore providing automated CAD/CAM part classification.

Shape comparison algorithms provide different approaches to select invariant features from 3D models. These shape comparison algorithms transform a 3D model into a set of n directly comparable attributes such as vectors $<a_1; a_2; \ldots a_n>$. Switching among model comparison algorithms can focus classification schemes on different aspects such as topology, local geometry patterns, feature interactions or gross shape. The flexibility of switching model comparison algorithms enables further optimization by matching comparison algorithm with classification schemes.

The aggregate distance between models in the same category should be relatively shorter than models falling into different categories. In applying the kNN algorithm to solid shapes and preferably CAD models, the following steps are taken. Given CAD models $\{s_1, s_2 \ldots s_n\}$, where s is a solid model, a category $c_1$ and the distance between $s_1$ and $s_2$ as $D(s_1; s_2)$ the kNN algorithm requires that:

$$\Box s_1, s_2, s_3, c_1:s_1; s_2 \in c_1 \wedge s_3 \notin c_1 \Rightarrow D(s_1; s_2) < D(s_1; s_3) \tag{1}$$

To improve the efficiency of learning classification schemes from example training models, distances produced by the model comparison algorithm, $D(s_1; s_2)$ should be adjusted to satisfy Equation (1). Assuming that $D(s_1; s_2)$ is produced by the gross difference of the two set of n properties representing $s_1; s_2$, the discriminatory power of each property can be studied, and weights can be assigned to each property according to its significance in computing distance between training models and query models. The distance in between a pair of models is drawn as the aggregate of some weighted distances among n properties:

$$D(s_1, s_2) = \sum_{i=1}^{n} w_i \cdot D(s_{1i}, s_{2i}) \tag{2}$$

$D(s_{1i}, s_{2i})$ represents the distance between property i of models $s_1$ and $s_2$, $w_i$ represents the weight of the property. Evaluation of $w_i$ through machine learning techniques is disclosed below.

Figure 3A:
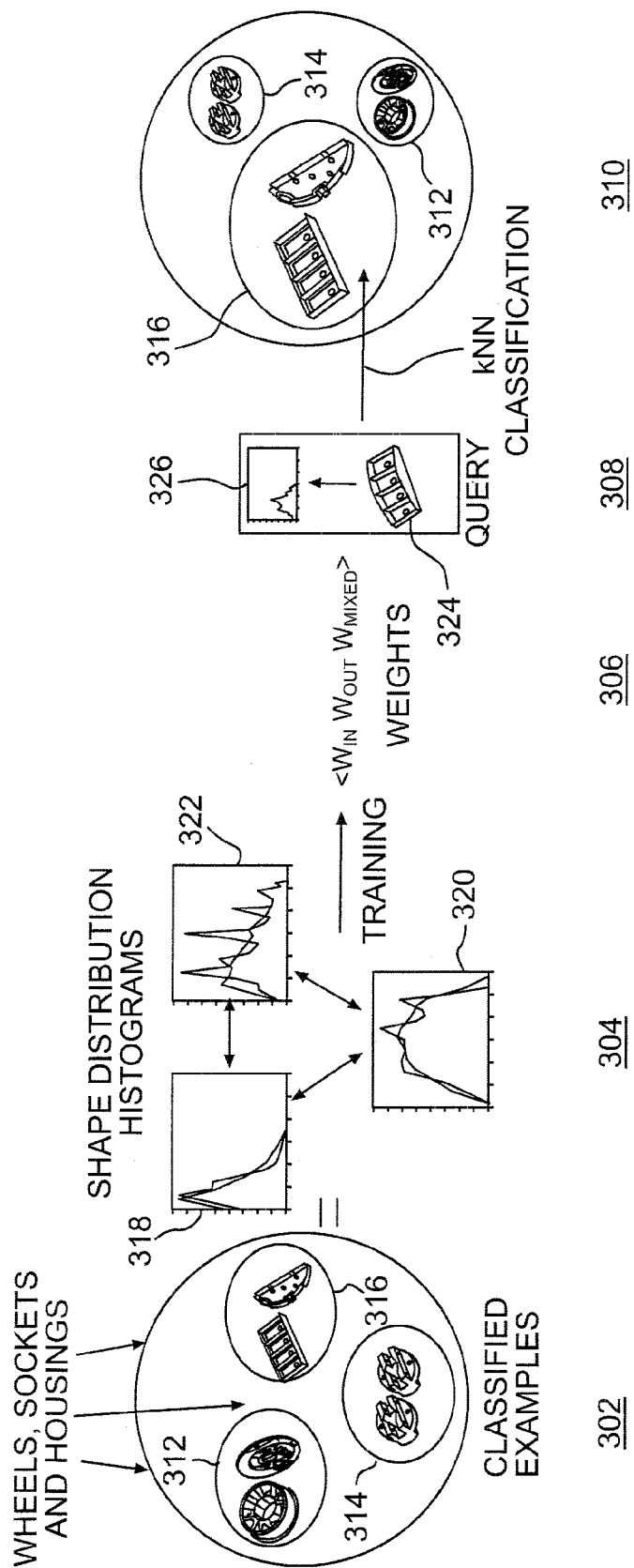
FIG. 3A shows a depiction of the method of classifying query models.

FIG. 3 shows the method of classifying query models. Step 302 shows a plurality of training models separated into classifications. In step 302, the classifications are wheels 312, sockets 314, and housings 316. However, it is to be understood that classifications can be crafted for a particular set of 3D models and need not be restricted to the three used in the example. Using the properties of wheels 312, sockets 314, and housings 316, shape distribution histograms are formed. Step 304 shows the wheels' shape distribution histograms 318, sockets' shape distribution histograms 320 and housings' shape distribution histograms 322. The shape distribution histograms are utilized to provide definitions for the respective classifications. Step 306 shows the weighting step, which will be discussed in more detail below. Step 308 shows the query model 324 and the query model shape distribution histogram 326. Then, using the kNN classification at step 310, query model 316 is placed into the correct classification, in this example, housings 316.

A shape distribution histogram can be viewed as a digital signature for a 3D model. Distribution-based techniques are used with enhancement for matching CAD models to perform statistical sampling of the shape properties of CAD models, and these samples are used to generate meaningful comparison among the models. Let S be a CAD model, let T= $\{t_1; t_2 \ldots t_k\}$ be a set of triangular facets that approximates the topology of S. Existing mesh generation algorithms, stereolithography exporters or VRML exporters can produce the facets of T. The facets in T can also be from an active data acquisition system working off of actual models.

In selecting a shape function, the D2 shape function was used which involves measuring the distance between two random points on the surface of a model. It is necessary to generate a sufficiently large number of random sample point pairs on surface of model S. The point pairs are selected to maximize discriminations. However, the selection is either random or according to a predetermined function such as a grid function. It is also necessary to generate a classification of the point-pair distances. In computing the D2 shape function, distances are classified based on their interaction with the local geometry and topology.

Figure 3B:
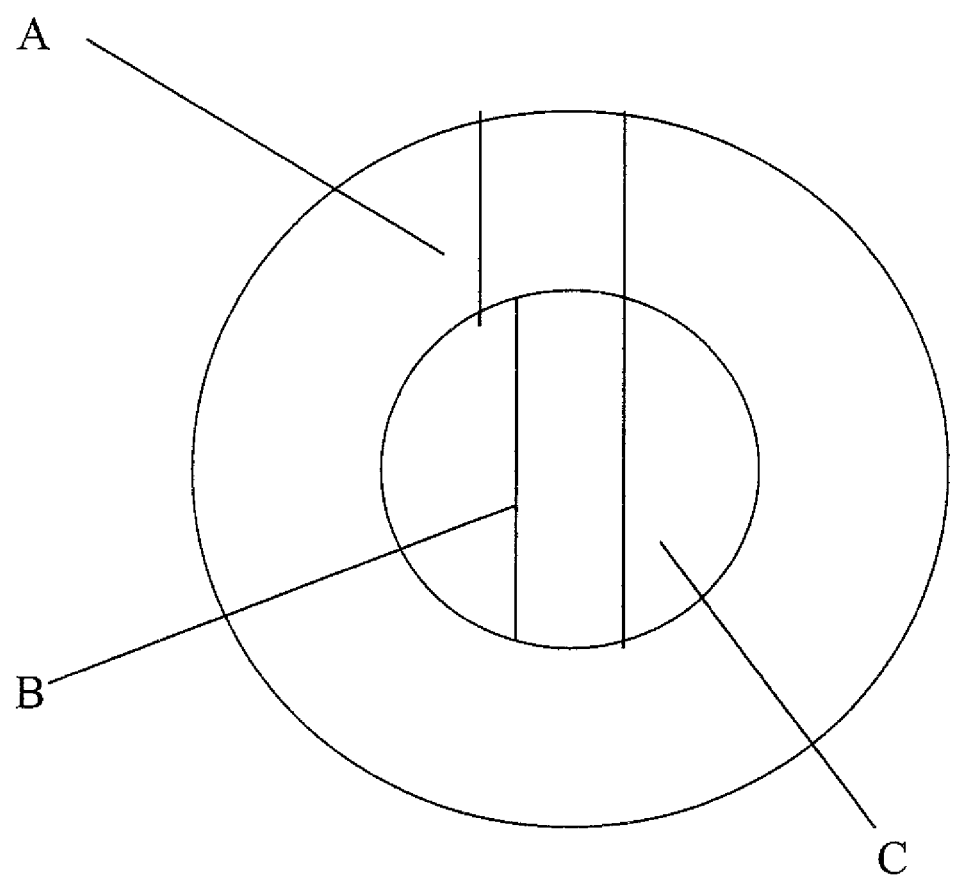
FIG. 3B shows a 2D example of the classification of point-pair distances.

Preferably, there are three kinds of interactions in the following description of one exemplary set of measures: IN distances, which are the distances of lines connecting two points that lie completely inside a model, OUT distances, which are the distances of lines connecting two points that lie completely outside a model, and MIXED distances, which are the distances of lines that connect two points that passes both inside and outside of a model. FIG. 3B shows these distances on a 2D model. Distance "A" represents the IN distance, distance "B" represents the OUT distance, and distance "C" represents the MIXED distance. The above exemplary measures are a mere instance of a more general idea for characterizing a model. Any other combinations of certain measures are also used to practice the current invention. Other examples of measures that can be used are: distributing sample points over a model's surface using techniques to bring out certain measures; using angles between selected points; using selected areas of triangles formed by selected triples; casting rays through pairs of points and counting intersections with a model surface, using the IN/OUT/MIXED conditions on triangles formed by triples of points; or using the convex hull of points on the surface of model and find its volume.

Figure 4A:
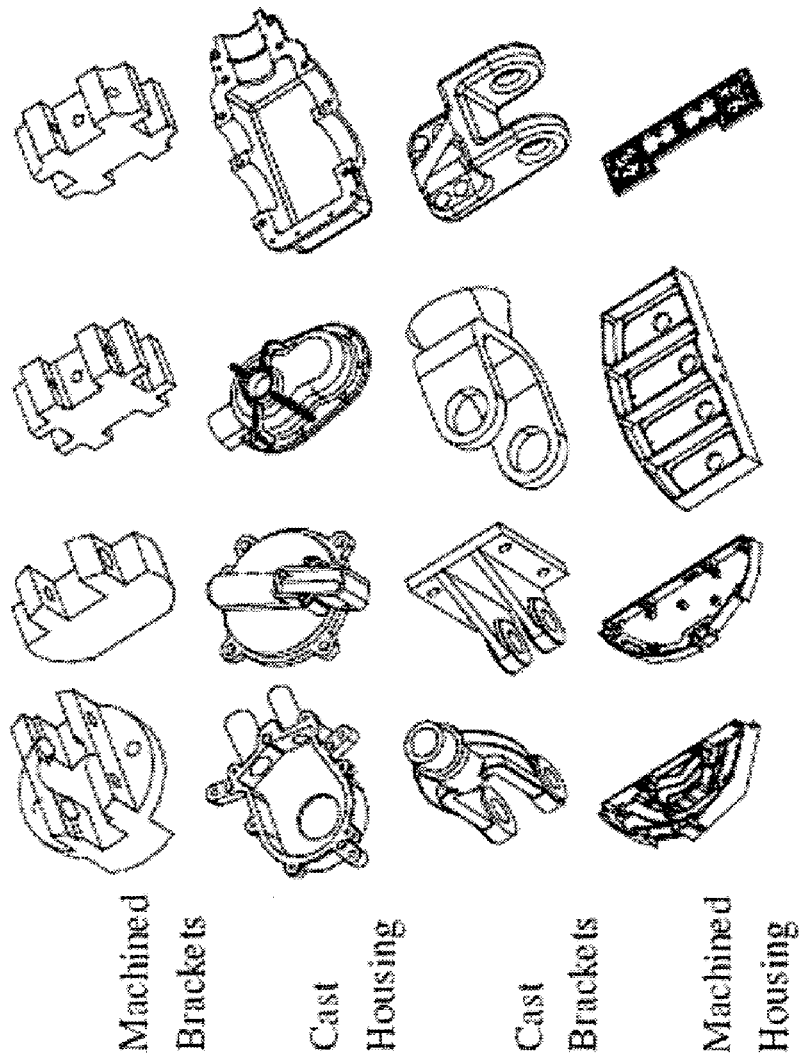
FIG. 4A shows a grouping of example models and classifications.
Figure 4B:
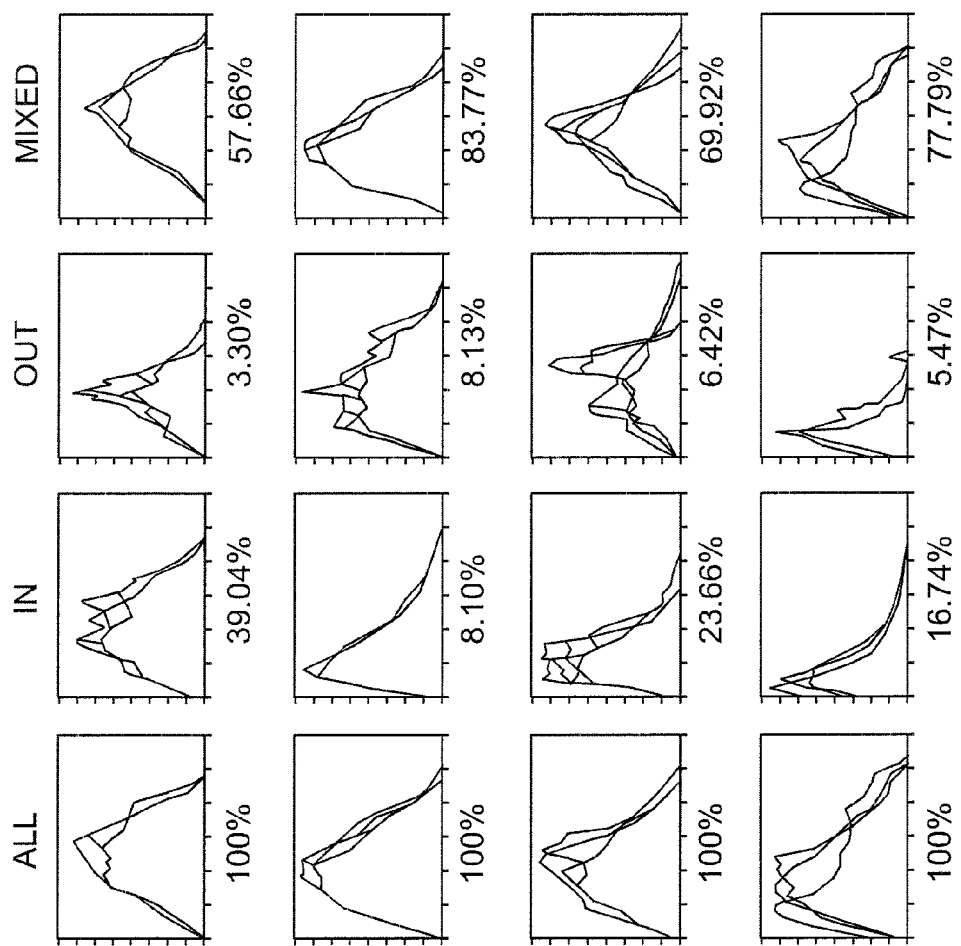
FIG. 4B shows the shape distribution histograms of the example models.

Using the exemplary measures discussed above, with the statistics of the classification of points and their Euclidean distances, a normalized probability vs. distance histogram is created for each distinct IN, OUT, and MIXED property set. The accumulated distributions of classifications are also recorded as a percentage ratios of point pairs falling into IN, OUT, and MIXED categories for the sampled model (IN %+OUT %+MIXED %=100%). These values are used to assess the significance of IN, OUT, MIXED distribution histograms. I.e., large differences in the IN % for two models would diminish the significance of a close measurement between the IN histograms. FIG. 4A shows a grouping of example models that could be used for training models. FIG. 4B shows corresponding histograms for the categories IN, OUT, MIXED, and ALL.

Shape distribution histograms are compared using curve matching techniques such as Minkowski $L_N$, earth mover's distance. A distribution example is discussed below.

Point pairs are sampled and classified to construct histograms as shown in FIG. 4B. Shape distribution histograms are compared to produce dissimilarity measures. IN, OUT, and MIXED histograms of the models are mapped to a three attribute vector $<h_{IN}, h_{OUT}, h_{MIXED}>$. The dissimilarity between models is represented by a per bin $L_1$ norm Minkowski distance between their corresponding shape distribution histograms. Computer software uses across each of the j histogram bins as:

$$L_1(h_1, h_2) = \frac{\sum_{i=0}^{n} |h_{1i} - h_{2i}|}{j} \quad (3)$$

This is done for each of the IN, OUT, MIXED histograms. The differences IN %, OUT %, and MIXED % are used to scale $L_1$ norm histogram distances to reflect the significance of correlations based on the differences in the sample sizes in each category of IN, OUT, and MIXED.

Figure 5:
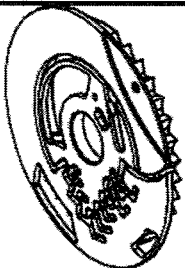
FIG. 5 shows a grouping of example models classified into groups.
Figure 5:
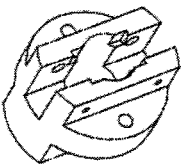
Figure 5:
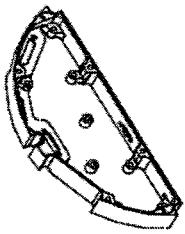
Figure 5:
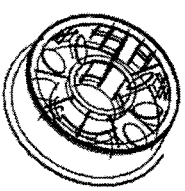
Figure 5:
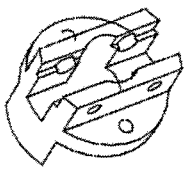
Figure 5:
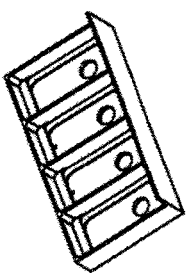
Figure 6:
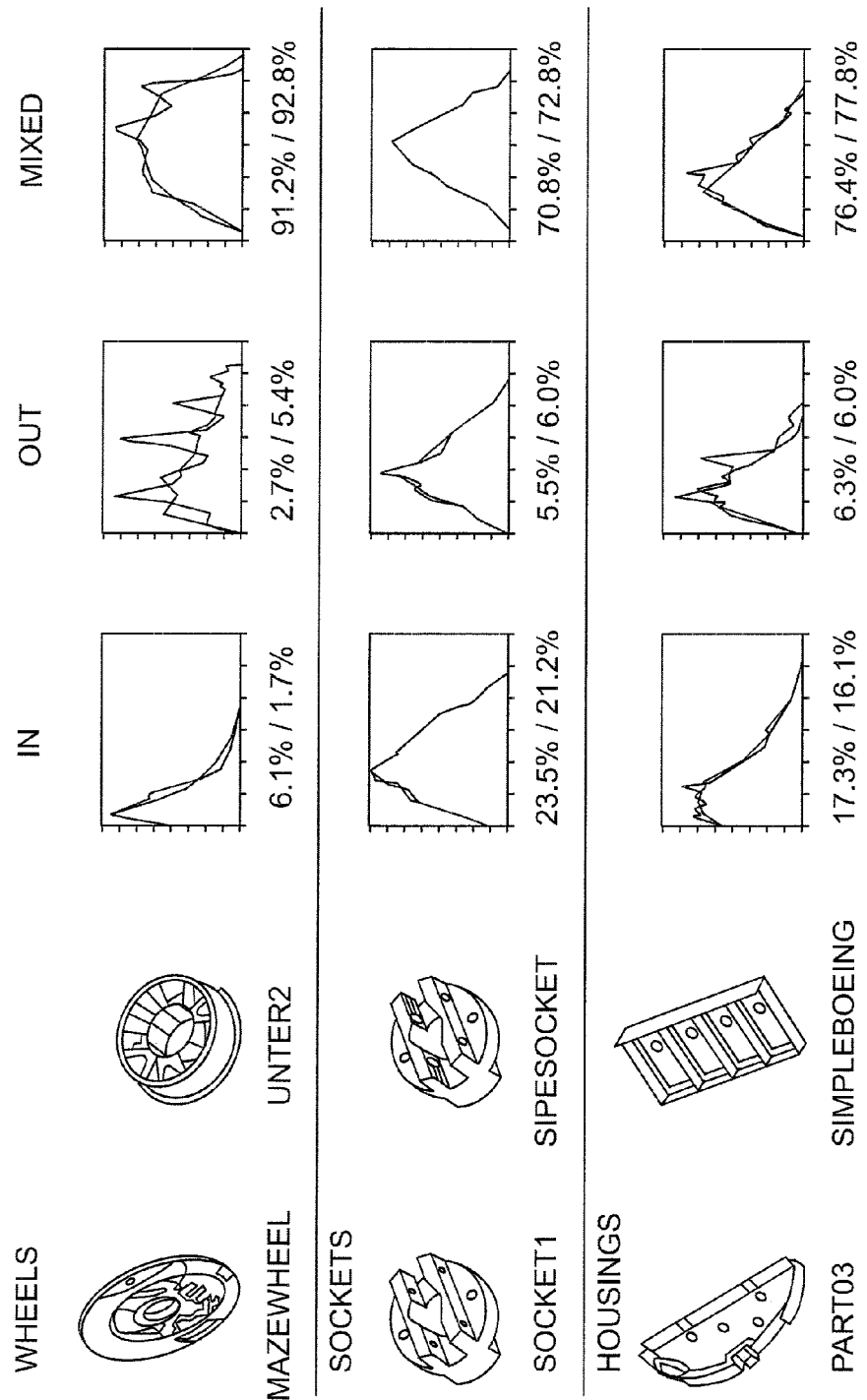
FIG. 6 shows the example models from FIG. 5 and their respective shape distribution histograms.

Averaged and scaled distances across all pairs of example parts as shown in FIG. 5 and FIG. 6 are illustrated with respect to the Mazewheel part in Table 1.

TABLE 1

Distances in between Mazewheel part and other Example Training Models

| Part | IN | OUT | MIXED | Average | Scaled |
|---|---|---|---|---|---|
| Unter2 | 15.7 | 72.2 | 31.8 | 39.9 | 122.9 |
| Socket1 | 57.9 | 58.9 | 78.1 | 65.2 | 232.5 |
| SipeSocket | 56.0 | 68.7 | 77.0 | 67.2 | 232.5 |
| Part03 | 16.2 | 32.1 | 39.1 | 29.2 | 97.63 |
| SimpleBoeing | 19.7 | 49.6 | 33.9 | 34.4 | 110.44 |

Table 1 demonstrates that the Mazewheel part could easily be misclassified in this simple example if one uses just average distance or scaled distance. The closest, in average and scaled distances, part to Mazewheel is Part03, instead of Unter2, which is supposed to be the only part that shares the Wheels category with Mazewheel. Table 1 illustrates the shortcoming of untrained shape matching algorithms as well as the deficiencies of simple combinations of measures. Neither average or scaled distance measures correctly produced the categorical grouping.

In determining optimal weights, each histogram is modeled to carry different degrees of significance in distance computation, $<w_{IN}, w_{OUT}, w_{MIXED}>$. The distance function should produce short distance for parts sharing the same category and long distance for parts falling into different categories such that the weighted distance of histograms, $w_{IN} \cdot IN + w_{OUT} \cdot OUT + w_{MIXED} \cdot MIXED$ minimizes the aggregate distance within a category and maximizes the aggregate distance across different categories.

Figure 7:
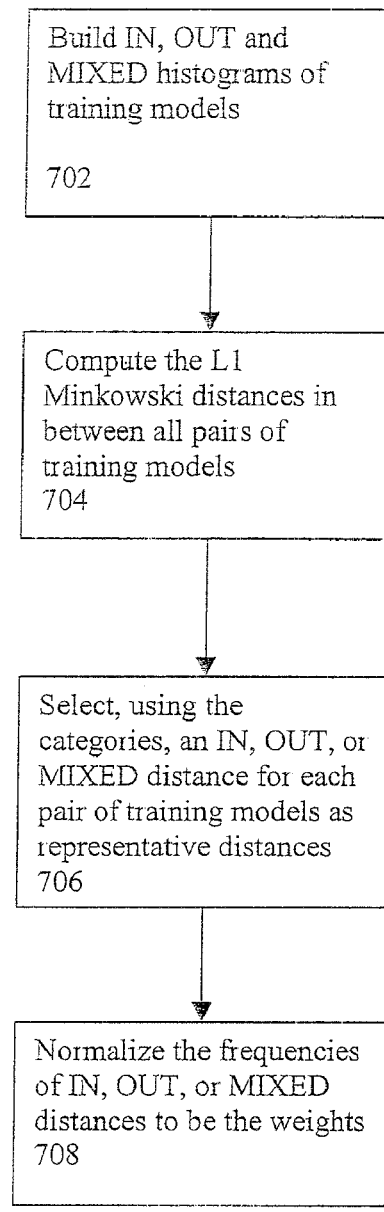
FIG. 7 shows a flow chart of the method used for determining the training of weights probability for training models.

During the training process, shape distribution histograms of all training models are compared to find out the frequencies of IN, OUT or MIXED distances being selected as the representative distance. Provided a set of training examples models, the training of weights probability for IN, OUT or MIXED histograms can be carried out as shown in FIG. 7.

At step 702, the training models are used to construct IN, OUT and MIXED histograms as signatures of each model. At step 704, L1 Minkowski distances in between all pairs of training models are computed. At step 706, the appropriate IN, OUT or MIXED distance is selected, using the categories for each pair of models, according to the corresponding categories, as the representative distance. At step 708, the frequencies of IN, OUT or MIXED distance being selected as representative distances to be the weights are normalized. Three distances, IN, OUT and MIXED are calculated for each pair of models. From each triplet of distances, only one suitable representative distance is selected for weights computation. The shortest distance is selected among IN, OUT and MIXED when two models fall into the same category. The longest distance is selected among IN, OUT and MIXED when two models fall into different categories. The frequencies of IN, OUT and MIXED distances being selected as representative distances, reflect the chance of an IN, OUT, and MIXED distance being the appropriate distance for aggregate distance computation. One example of the weights triplet $<W_{IN}, W_{OUT}, W_{MIXED}>$ are derived as:

$$w_i = \frac{\#i}{\#IN + \#OUT + \#MIXED}, i \in \{IN, OUT, MIXED\} \quad (4)$$

The above weight determination is one example, and other weight definitions are also applicable to practice the current invention.

Different weight triplets are specifically produced for each category. When computing distance between a query model and a training model, the weight triplets that correspond to the training model's category will be used to scale the distance among IN, OUT and MIXED histograms.

TABLE 2

Frequencies of IN, OUT, and MIXED being selected as the appropriate distances.

| Category | Part | #IN | #OUT | #MIXED |
|---|---|---|---|---|
| Wheel | Mazewheel | 1 | 1 | 3 |
| | Unter2 | 1 | 0 | 4 |
| Sockets | Socket1 | 0 | 0 | 5 |
| | SipeSocket | 0 | 0 | 5 |
| Housing | Part03 | 1 | 0 | 4 |
| | SimpleBoeing | 1 | 1 | 3 |

TABLE 3

Weights of IN, OUT and MIXED for example dataset.

| Category | $W_{IN}$ | $W_{OUT}$ | $W_{MIXED}$ |
|---|---|---|---|
| Wheel | 0.2 | 0.1 | 0.7 |
| Sockets | 0 | 0 | 1.0 |
| Housing | 0.2 | 0.1 | 0.7 |

EXAMPLE 1

The frequencies and weights of a set of mechanical parts for "Wheels", "Sockets", and "Housings" categories are shown in Table 2 and Table 3. Both average and scaled distance functions returned parts from "Housings" group as the nearest to Mazewheel part which, instead, belongs to the "Wheel" group. The weight triplet $<w_{IN}; w_{OUT}; w_{MIXED}>$ revises distance between Mazewheel and Part03 to be 39.1 and distances between Mazewheel and Unter2 reduces to be 33.9. Distances of other parts are shown in Table 4 below. The use of $<w_{IN}; w_{OUT}; w_{MIXED}>$ favors the MIXED distances and decreases the influence of OUT distance the above use scales up the largest MIXED difference between Mazewheel part and Part03 suppresses the largest difference, OUT for Unter 2.

TABLE 4

Revised distances in between Mazewheel Part and other Example Training Models.

| Part | Average | Scaled | Revised |
|---|---|---|---|
| Unter2 | 39.9 | 122.9 | 33.9 |
| Socket1 | 65.2 | 232.5 | 78.1 |
| SipeSocket | 67.2 | 232.5 | 77 |
| Part03 | 29.2 | 97.63 | 39.1 |
| SimpleBoeing | 34.4 | 110.44 | 37.1 |

Figure 8:
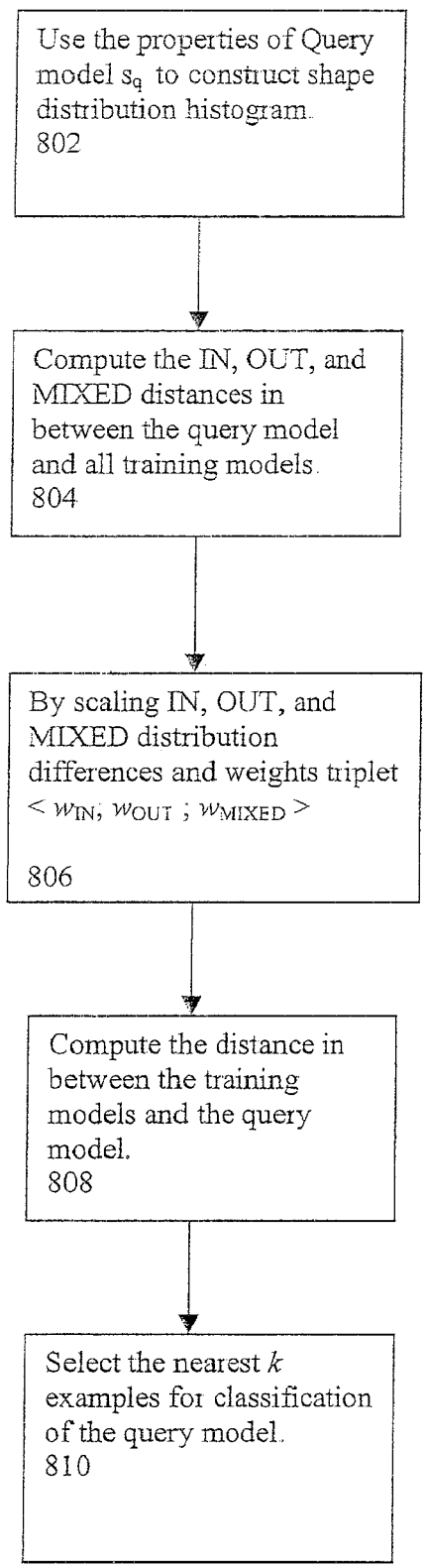
FIG. 8 shows a flow chart of the steps taken for classifying a query model.

Given the set of training models and the set of weight triplets, one can accept and classify new query models, $s_q$. In FIG. 8, the steps taken for classifying a query model are shown. In step 802, the properties of the query model are taken and used to construct a shape distribution histogram. In step 804, the IN, OUT and MIXED distances in between the query model and training models is computed. In steps 806 and 808, the distance in between the training models and the query model is computed by scaling IN, OUT, and MIXED distribution differences and weights triplet $<w_{IN}; w_{OUT}; w_{MIXED}>$. In step 810, the nearest k examples are selected for classification of the query model.

EXAMPLE 2

The Socket2 part is a minor variation on Socket1 as shown in FIG. 5. Shape distribution histograms are constructed for Socket2 based upon its properties and compared to the histograms of the training models. Representative distances are computed with weights $<w_{IN}; w_{OUT}; w_{MIXED}>$ as shown in Table 5 below. Query model Socket 2 is considered to be the closest to example training models Socket1 and SipeSocket in this dataset.

TABLE 5

Distances between Socket 2 and Example Training Models

| Category | Part | Distance |
|---|---|---|
| Wheel | Mazewheel | 90.05 |
| | Unter2 | 39.1 |
| Sockets | Socket1 | 4.58 |
| | SlipSocket | 6.99 |
| Housing | Part03 | 73.9 |
| | SimpleBoeing | 60.48 |

The classification of the query model $s_q$ is the goal. The k closest example training models are used to increase the robustness of the classification and reduce the effect of possible outliers or noise in the example training model. Based on the categories of the k nearest example training models, the query model $s_q$ is classified by a locally weighted function provided to kNN learning algorithm using either Majority or Gaussian Kernel Regression. The Majority Method returns the majority of categories of k nearest training examples neighbors as the classification. All k example neighbors "vote" for their classification, and the classification with the highest number of votes will be returned as the classification of $s_q$. Gaussian Kernel Regression assigns weights to the k nearest example neighbors, $s_i$ according to a Gaussian kernel function. $D(k_i, s_q)$ is the distance between example model $s_i$ and query model $s_q$ with a standard deviation σ of:

$$1/(2\pi)^{1/2}\sigma * e^{-D(si,sq)2/2\sigma} \quad (5)$$

The category with the highest accumulated weight is returned as the classification of $s_q$.

EXAMPLE 3

For k=3, the categories of the 3 closest example models to Socket 2 have been considered to be the classification of Socket 2. The standard deviation of models, 28.5 has been used as the standard deviation in the Gaussian function. From Table 6 below both Majority and Kernel Regression classifications return Sockets to be the category of query model Socket 2, which is correct.

TABLE 6

Classifying Socket2

| Category | Example | Vote | G(x) |
|---|---|---|---|
| Wheel | Unter2 | 1 | 0.007 |
| Total | | 1 | 0.007 |
| Sockets | Socket1 | 1 | 0.123 |
| | SipeSocket | 1 | 0.129 |
| Total | | 2 | 0.0252 |

Now it can be demonstrated how classifiers can be created by using two different sets of CAD models under two different classification schemes. That is classifying models based on appearance or functionality and classifying models based on general manufacturing properties.

EXAMPLE 4

Figure 9A:
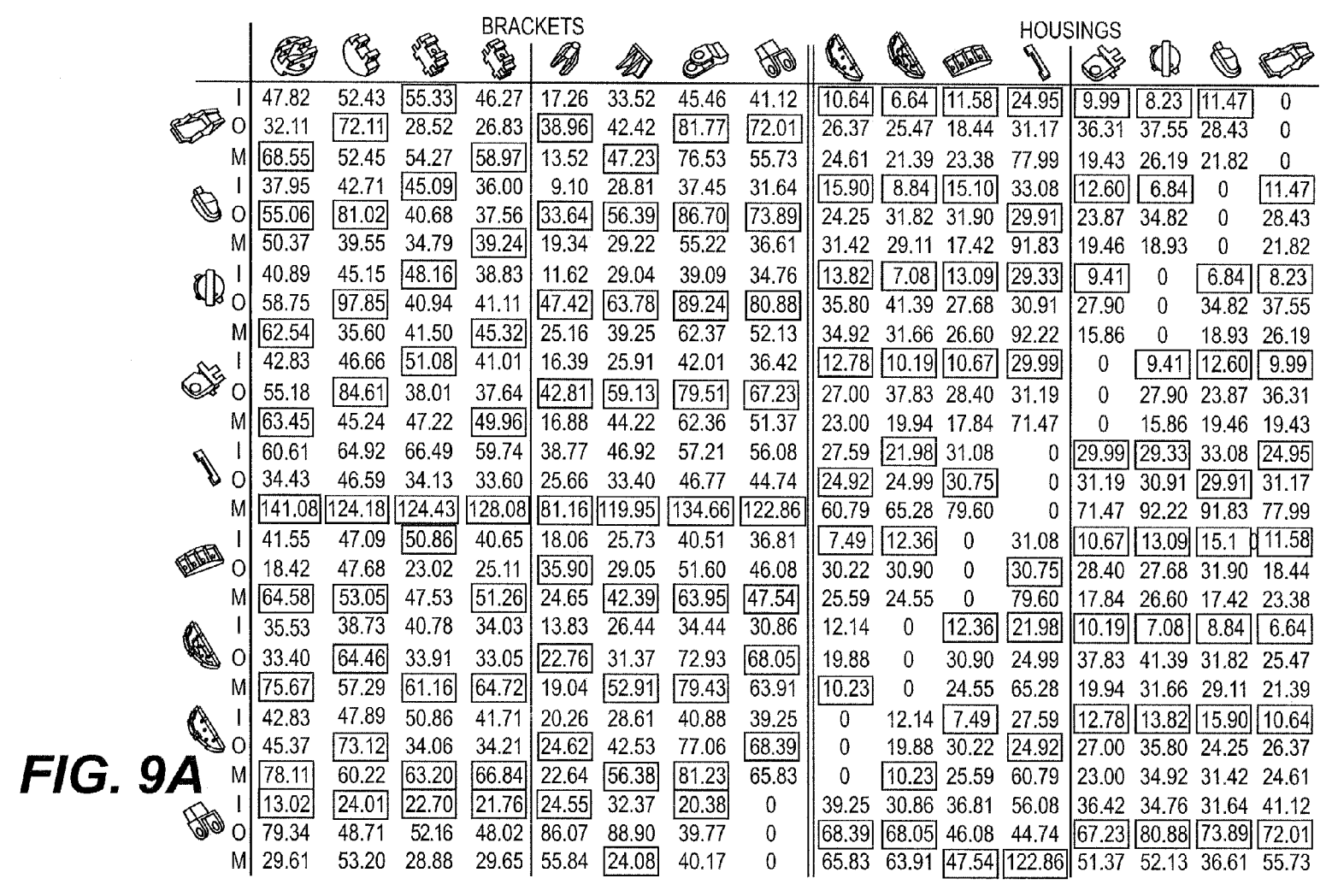
Figure 10A:
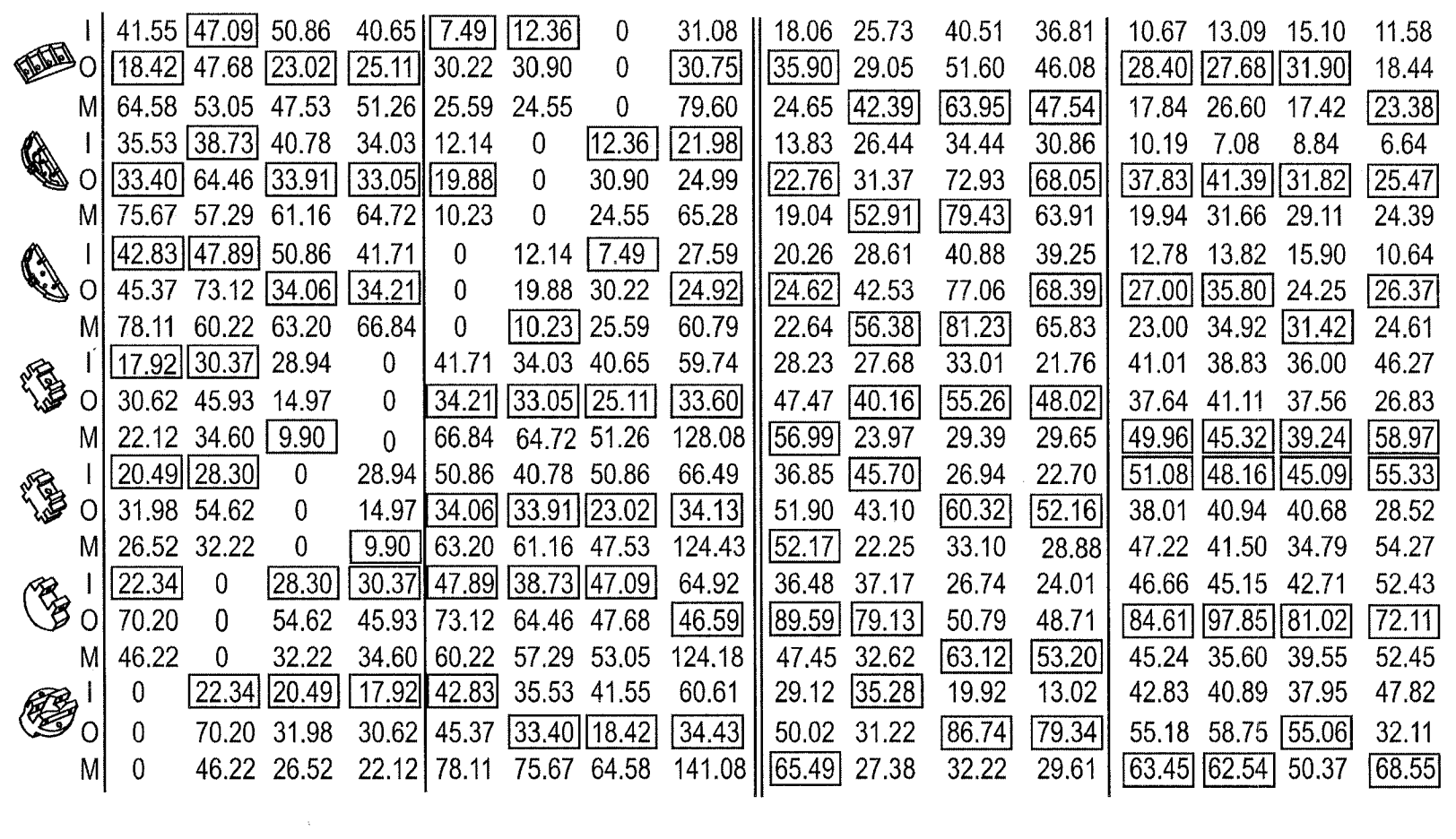

Training example models presented in FIGS. 4A and 4B are grouped into four different categories; Machined Brackets, Cast Housings, Cast Brackets and Machined Housings. To demonstrate, the training technique can learn different weighting schemes according to given examples. Four groups of models are classified into two different classifications, Functional classification (Brackets or Housings), and Manufacturing classification (Machined or Cast). Pairwise distances between all models are computed and shown in FIG. 9 (Functional classification) and FIG. 10 (Manufacturing classification) to obtain two different sets of weights, boxed distances in the figures denotes representative distances. Table 7 and Table 8 below summarize different weighting schemes captured from the example training models. For example, in functional classification, 47 IN distances, 23 OUT distances and 46 MIXED distances are selected as representative distances. By normalizing the proportion of representative distances, a weighting scheme for functional classification could be 39% for IN, 23% for OUT and 38% MIXED. Weighting schemes learned from this process will be used as functions input during the nearest neighbors classification process.

TABLE 7

Derived weights for Functional Classification

| Category | IN | OUT | MIXED |
|---|---|---|---|
| Brackets | 39%(47) | 23%(27 | 38%(46) |
| Housings | 44%(53) | 28%(33) | 28%(34) |

TABLE 8

Derived weights for Manufacturing Classification

| Category | IN | OUT | MIXED |
|---|---|---|---|
| Machined | 23%(30) | 40%(52) | 37%(48) |
| Cast | 48%(57) | 24%(29) | 28%(34) |

After the process, discussed above in Example 4, the classification of the query model $s_q$ is computed and returned. Considering the categories of the k nearest example models, the classification of the query model $s_q$ is determined by a locally weighted function provided to the nearest neighbor classification.

EXAMPLE 5

Figure 11:
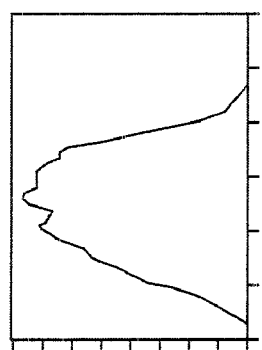
FIG. 11 shows a depiction of an example query model and shape distribution histogram.
Figure 11:
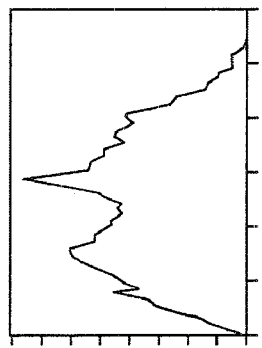
Figure 11:
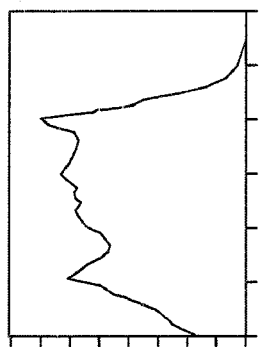
Figure 11:
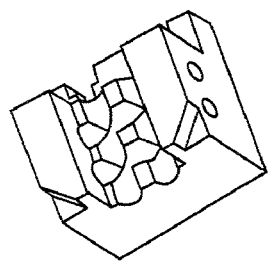

The example training models and weighting schema used in Example 4 are used in this example. The classification process is illustrated by classifying query model, Base2 as shown in FIG. 11. Intuitively, Base2 is a bracket and manufactured by machining processes. Classification processes with both weighted functions on functional and manufacturing classifications are used. First, the distance is computed and the appropriate weighting schema is applied for each category to obtain a weighted distance between example training models and the query model. FIGS. 12 and 13 show the resulting distances and classifications between query models and example training models under both functional and manufacturing categorizations. Using the Majority method to classify the query model. In this example, k=5 is used, and the five closest training models are picked to vote for the classification of the query model. The five closest weighted distances as shown in FIGS. 12 (functional classification) and 13 (manufacturing classification) are boxed. Under functional classification weighting schema as shown in FIG. 12, query model Base2 is classified as a bracket since four out of five of its closest neighbors come from the Bracket category. Under manufacturing classification weighting schema as shown in FIG. 13, query model Base2 is classified as a Machined part since three out of five of its closest neighbors come from the machined parts category.

Using the Gaussian Regression method to classify the query model, the resulting Gaussian weight of each example is shown in FIGS. 12 and 13. Total cumulative Gaussian weights are present in bold face while the categories with higher weights are boxed. The classification result is the same as using majority method, the query model is classified into Brackets and Machined categories. Note that this regression method bias towards the closest model, which may generate a weight that dominates the others.

Example 5 demonstrates that different weights learned in the previous steps can be used to effectively classify query models under different classifications schemes along with the same set of training models.

EXAMPLE 6

The method to learn and classify was applied to an expanded data set of 100 CAD models according to manufacturing properties. This method has been implemented in Java/Perl and executed on Linux platforms. However, it is to be understood that any applicable platform could be used to perform the method. Experiments have been conducted using a subset of mechanical part data from the National Design Repository. The datasets have been initially classified by hand into (1) Machined parts and (2) parts that are first cast and then have their finishing features machined. The engineering rationale in this classification is that parts that are exclusively machined are usually high-precision parts, or parts made in small batches (i.e., for custom jobs). Cast-then-machined parts are typically from larger production runs and generally have much looser tolerance considerations for the non-machined surfaces of the object. In this case, the investment of a physical plant is larger, as is the manufacturing production plan (i.e., one needs to machine a mold with which to do casting). Training examples have been randomly selected based on this classification. The objective was to see if the system could learn weights from the training examples and then classify the non-training examples in a manner consistent with the human classification. The experiment was repeatedly performed to confirm the robustness of the approach. The results are summarized in Table 9 below.

TABLE 9

Classification statistics

| | Correctness |
|---|---|
| Highest | 76% |
| Average | 63% |

In these experiments, the highest classification correctness reached 76%, with an average classification correctness of 63%. It needs to be noted that there are no other fully automated, customizable, part classification schemes for 3D CAD data. As with any automated classification system, performance depends on the quality of training examples and the make up of the overall data set. In this example, the data from the National Design Repository was used. While the CAD models selected were all real engineering artifacts, they exhibit considerable heterogeneity and variability within classes. In a more realistic setting, such as at an auto manufacturing plant or airplane manufacturing plant, where the datasets would be much larger and more structurally homogeneous within classes, better training classes can be identified. For example, instead of providing random examples as in the example above, handpicking examples by experts can improve the accuracy of classification.

EXAMPLE 7

Figure 14:
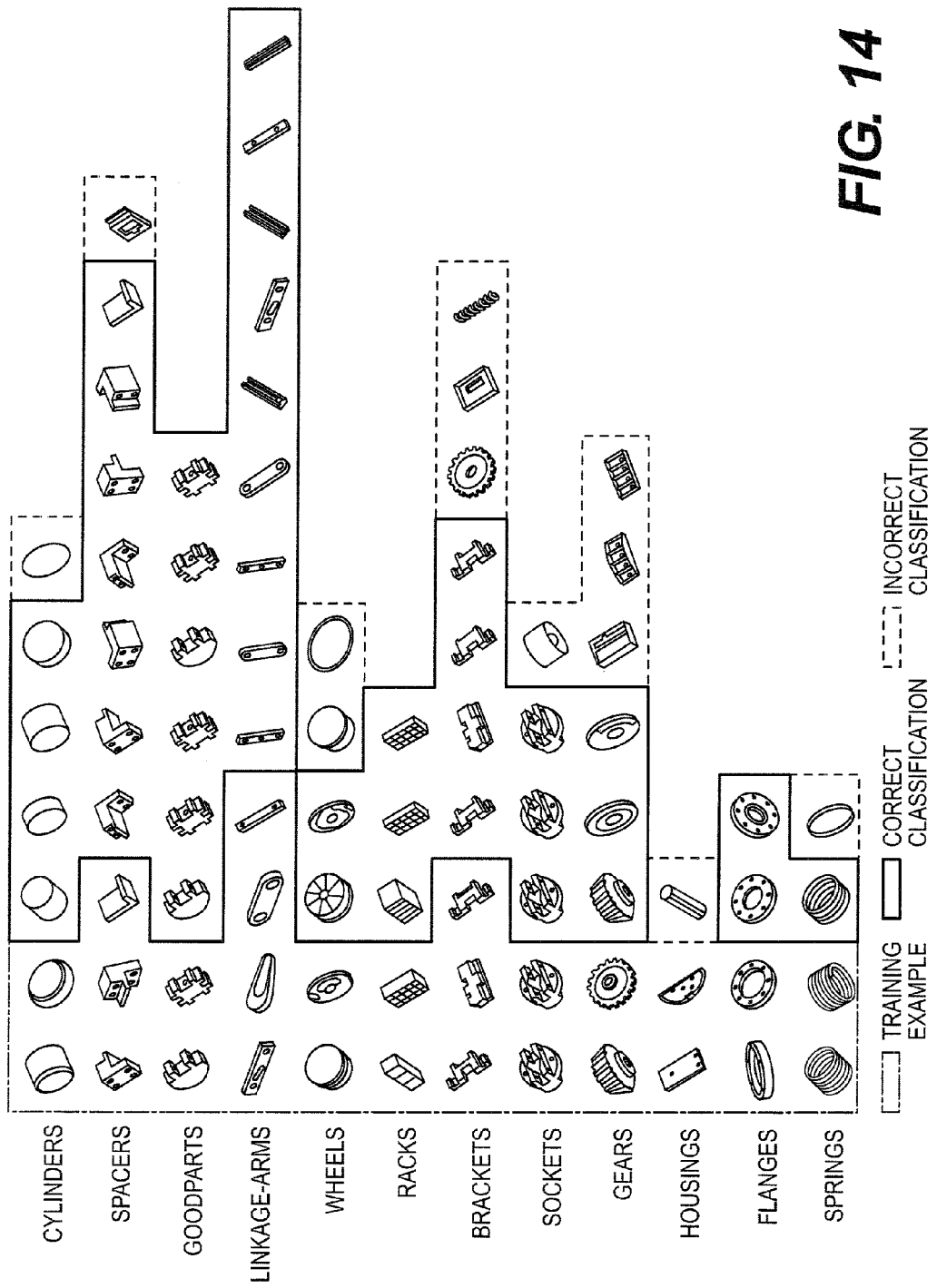
FIG. 14 shows the classification of solid models used in Example 7.

In this example shape and functionality were classified. 85 CAD models were first manually classified into 12 categories according to the general characteristics of shape or function for the models. One exemplary clustering or classifying scheme is kNN. Other schemes are also applicable to practice the current invention. The kNN classifier has been trained using a subset of the models and then used to classify the remaining ones. The number of training examples per class has been chosen proportional to the size of the class. The classifier performed extremely well at classifying Linkage-arms from the variable radius Spectrometer assembly from the National Institute of Standards and Technology. As shown in Table 10 below, more than 70% of kNN classifications have been correct in the experiments. That is, given a query model, over 70% of the time, the classifier has given the query model the correct class label as the top choice. The kNN classification of CAD models along with their categories is shown in FIG. 14.

TABLE 10 kNN classification statistics for shapes

| Shape | Correctness |
| --- | --- |
| Highest | 80.70% |
| Lowest | 64.91% |
| Average | 72.30% |
| Std-dev | 4% |

EXAMPLE 8

Figure 15:
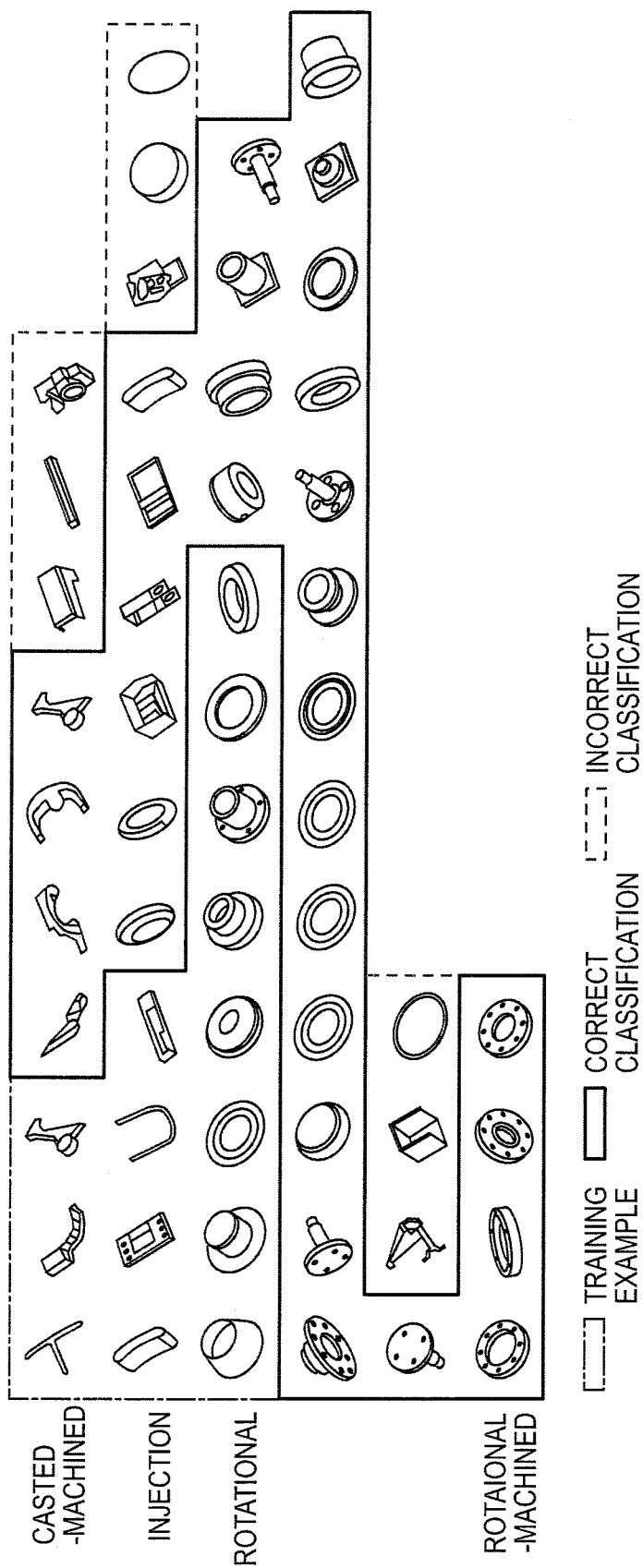
FIG. 15 shows the classification of solid models used in Example 8.

In this example the process was classified. 56 CAD models have been hand classified into 4 categories according to general characteristics of the manufacturing processes that would be used to create them: rotational parts, injection molded parts, cast-then-machined parts, and rotational-machined parts. The kNN classifier performed similarly in all categories in Example 8. Even though the average correctness of the kNN classifier for this example has not been as strong as that of Example 7 above, the best performances have been nearly equal. The results can be seen below in Table 11 for Example 8. The kNN classification for Example 8 is shown in FIG. 15.

Figure 16:
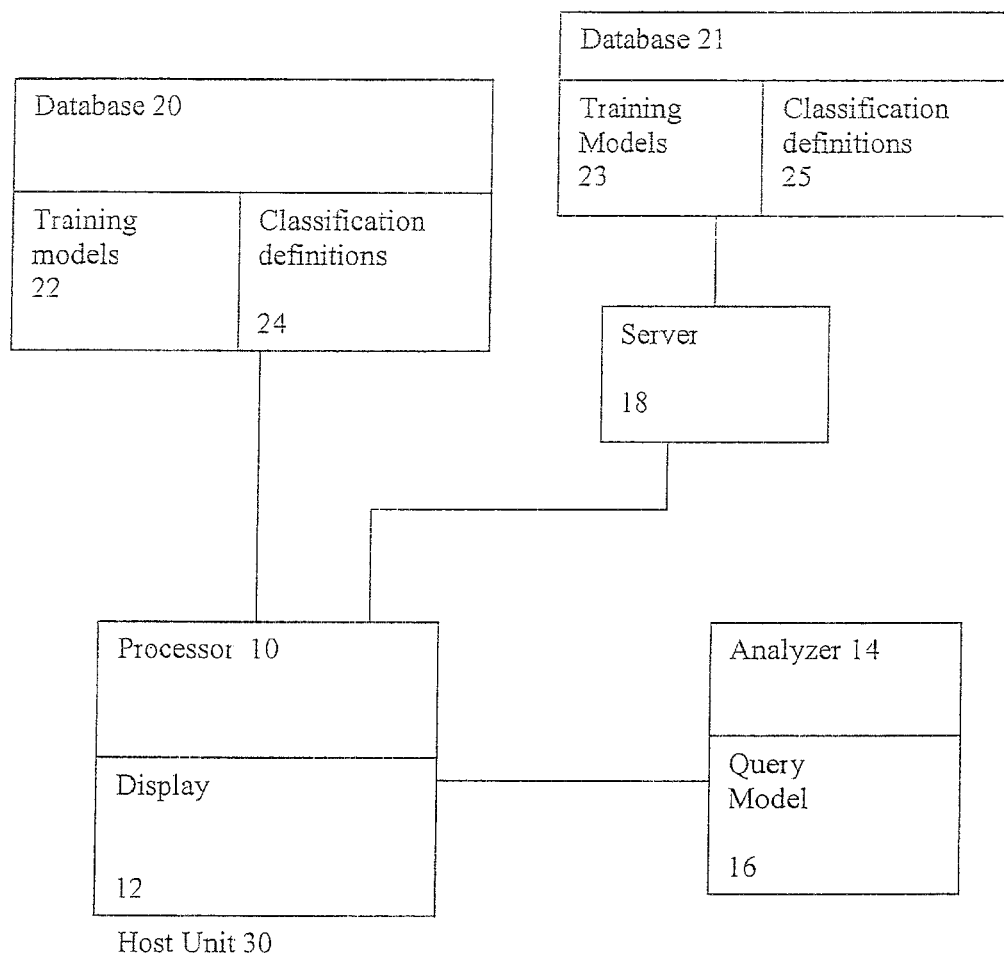
FIG. 16 shows a block diagram depicting the system utilized in performing the search and classification method.

The method disclosed above can be used to classify and cluster large groups of models. Classification of models takes one part at a time and produces a labeling (i.e. class membership) for each part. Clustering utilizes a very large database and identifies the classes themselves. FIG. 16 shows a system that utilizes the methods disclosed above. In employing the method, host unit 30 is used for housing a processor 10 and display 12. Host unit 30 may be a client workstation or other computer device enabled to perform searching tasks and perform classification of query model 16. Host unit 30 is connected to database 20 and may additionally be connected via server 18 to database 21. Host unit 30 is a hand held or mobile computer in one preferred embodiment to access maintenance drawings. Database 21 may be located on a local area network or on a wide area network and may function as a dedicated database for storing solid model data or other data related to engineering parts. Solid models stored in databases 20 or 21 or used for query model 16 may be represented in a variety of data formats such as .dgn, and .dfx/.dwg formats. However, the invention is not limited to the solid model being represented in any particular data format.

Database 20 and database 21 are used to respectively store training models 22 and 23. Database 20 and database 21 can further respectively store classification definitions 24 and 25. The storage of training models 22, 23 and classification definitions 24, 25 on databases 20, 21 provide an end-user with easy access to a wide variety of information, thereby permitting an end-user to tailor a search for a query model to his or her individual needs. An end-user may also utilize the databases to access classification definitions 24, 25, that are pertinent to his or her specific search or classification needs.

Additionally, host unit 30 can be connected to an analyzer 14 that is enabled to render a solid model into a query model 16 that is in the proper data format for use in the system. Analyzer 14 pre-processes the query data by taking a solid model and transforming it into a vector, or graph to be used in a query. Query model 16 may then be used to search the databases for proper classifications and similar solid models.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of classifying models comprising the steps of:
providing a processor, wherein the processor performs the steps of:
determining a first set of values based on predetermined properties of training models;
defining classifications based upon said first set of values;
determining a second set of values based on predetermined properties of a query model;
comparing said second set of values to said classifications; and
determining a classification of said query model based on said comparing step.

2. The method of claim 1, wherein said predetermined properties of said training models or said query models comprise a first set of distances between points selected on said training models or said query model; wherein said first set of distances comprises a set of predetermined shape interrogation measures.

3. The method of claim 2, wherein said predetermined shape interrogation measures include IN distances, OUT distances, and MIXED distances measured at point pairs placed on a surface of said training models or said query model to maximize discrimination.

4. The method of claim 3, wherein said point pairs are randomly selected.

5. The method of claim 3, wherein said point pairs are selected according to a predetermined grid function.

6. The method of claim 1, wherein said step of defining classifications further comprises weighting said first set of values; wherein said weighting step further comprises normalizing said first set of values.

7. The method of claim 6, wherein said classifications for said training models comprise shapes and functionality.

8. The method of claim 6, wherein said classifications comprise manufacturing processes to build said training models.

9. The method of claim 1, wherein said query model and said training models are models of 3D objects.

10. A method of searching for a model comprising the steps of:
using a processor, wherein the processor performs the steps of:
determining a first set of values based on predetermined properties of a query model;
comparing said first set of values to definitions for classification, wherein said definitions for said classification are based on a second set of values that is determined by predetermined properties for a group of training models; and
determining a classification of said query model based on said comparing step.

11. The method of claim 10, wherein said predetermined properties of said training models or said query model comprise a first set of distances between points selected on said training models and said query model, wherein said first set of distances comprises a set of predetermined shape interrogation measures.

12. The method of claim 11, wherein said predetermined shape interrogation measures included IN distances, OUT distances, and MIXED distances; wherein said IN distances, OUT distances, and MIXED distances are measured at point pairs placed on a surface of a training model or said query model to maximize discrimination.

13. The method of claim 12, wherein said point pairs are randomly selected.

14. The method of claim 12, wherein said point pairs are selected according to a predetermined grid function.

15. The method of claim 10, wherein the step of determining a classification comprises a step of weighting said second set of values, wherein said weighting step comprises normalizing said first set of values.

16. The method of claim 15, wherein said definitions for classification comprise shapes and functionality.

17. The method of claim 15, wherein said definitions for classification comprise manufacturing processes to build said training models.

18. The method of claim 10, wherein said query model and said training models are models of 3D objects.

19. A system for classifying models comprising:
a database for storing a plurality of training models and classification definitions, wherein said classification definitions are based upon a first set of values determined by predetermined properties of said training models; and
a host unit connected to said database for receiving a query model, and determining a second set of values based on said predetermined properties of said query model, said host determining a classification of said query model by comparing said second set of values to said classification definitions.

20. The system of claim 19, wherein said query model and said training models are models of 3D objects.

* * * * *